United States Patent
Typinski et al.

(10) Patent No.: US 10,978,929 B2
(45) Date of Patent: Apr. 13, 2021

(54) PUSH ROD FOR AN ELECTRO-MECHANICAL ACTUATOR SYSTEM AND A METHOD OF MANUFACTURING THE SAME

(71) Applicant: BorgWarner Inc., Auburn Hills, MI (US)

(72) Inventors: Ronald P. Typinski, Macomb, MI (US); Jerome Fisher, Royal Oak, MI (US)

(73) Assignee: Borg Warner Inc., Auburn Hills, MI (US)

( * ) Notice: Subject to any disclaimer, the term of this patent is extended or adjusted under 35 U.S.C. 154(b) by 110 days.

(21) Appl. No.: 16/166,648

(22) Filed: Oct. 22, 2018

(65) Prior Publication Data
US 2019/0123615 A1 Apr. 25, 2019

Related U.S. Application Data

(60) Provisional application No. 62/576,197, filed on Oct. 24, 2017.

(51) Int. Cl.
*H01F 7/08* (2006.01)
*H02K 7/00* (2006.01)
*H02K 7/14* (2006.01)
*H02K 15/00* (2006.01)
*H02K 41/02* (2006.01)
*B21C 1/00* (2006.01)

(52) U.S. Cl.
CPC .............. *H02K 7/003* (2013.01); *H02K 7/14* (2013.01); *H02K 15/00* (2013.01); *H02K 41/02* (2013.01); *B21C 1/00* (2013.01)

(58) Field of Classification Search
CPC ....................................................... H02K 7/003
USPC ................................................... 251/129.15
See application file for complete search history.

(56) References Cited

U.S. PATENT DOCUMENTS 8,576,032 B2 * 11/2013 Herbert ............... F16K 31/0672
335/220
8,733,395 B2 * 5/2014 Najmolhoda ......... F16K 31/082
137/596.17

(Continued)

OTHER PUBLICATIONS

Pressteck S.p.A., "PressTeck Automotive Webpage", http://presstecks pa.com/automotive, 2016, 3 pages.

(Continued)

*Primary Examiner* — Alexander Talpalatski
(74) *Attorney, Agent, or Firm* — Howard & Howard Attorneys PLLC

(57) ABSTRACT

A push rod for use in a vehicle with an electro-mechanical actuator system, which has an armature and a core, selectively moves an object of the vehicle as the armature moves between first and second positions. The push rod includes a body and a flange extending radially away from the body to a perimeter surface. The flange has an engagement surface defining a channel. The perimeter surface defines a perimeter opening at the channel for facilitating flow of a fluid into the channel between the engagement surface and the core for preventing a vacuum therebetween. A method of manufacturing the push rod includes the steps of providing a material, and drawing and swaging the material to produce the push rod.

15 Claims, 5 Drawing Sheets

(56) References Cited

U.S. PATENT DOCUMENTS

| | | | | |
|---|---|---|---|---|
| 8,882,475 B2* | 11/2014 | Aritomi | ............... | F02M 59/466 |
| | | | | 417/298 |
| 2002/0141881 A1* | 10/2002 | Okada | ................. | F04B 27/1804 |
| | | | | 417/222.2 |
| 2009/0256092 A1* | 10/2009 | Nordstrom | .......... | F16K 31/0613 |
| | | | | 251/129.15 |
| 2011/0215271 A1* | 9/2011 | Voss | ........................ | B60T 8/363 |
| | | | | 251/129.15 |

OTHER PUBLICATIONS

Pressteck S.p.A., "Photo of Example of Stainless Steel Deep Draw Line", https://www.flickr.com/photos/pressteckitaly/5817317543/in/photostream, Jun. 10, 2011, 2 pages.

* cited by examiner

PUSH ROD FOR AN ELECTRO-MECHANICAL ACTUATOR SYSTEM AND A METHOD OF MANUFACTURING THE SAME

RELATED APPLICATIONS

This application claims priority to and the benefit of U.S. Provisional Patent Application No. 62/576,197, filed on Oct. 24, 2017, the entire contents of which are hereby incorporated by reference.

1. FIELD OF THE INVENTION

A push rod for use in a vehicle with an electro-mechanical actuator system having an armature and a core, to selectively move an object of the vehicle as the armature moves between a first position and a second position.

2. DESCRIPTION OF RELATED ART

Electro-mechanical actuators have been used in many different applications for selectively moving a desired object. The electro-mechanical actuators generate a magnetic field, which moves an armature comprised of a ferrous material between a plurality of positions. Movement of the armature results in movement of the object. In one example, the electro-mechanical actuator includes a push rod, which engages the armature and acts as an extension of the armature for selectively moving the object.

Although the push rod has been effective at moving the object, it is susceptible to restricted movement by the formation of a vacuum within the electro-mechanical actuator. Furthermore, the push rod is produced by machining solid billet, which is expensive, time consuming, and produces an abundance of waste material. As such, there remains a need to provide an improved push rod for an electro-mechanical actuator.

SUMMARY OF THE INVENTION AND ADVANTAGES

The subject invention provides for a push rod for use in a vehicle with an electro-mechanical actuator system having an armature and a core having a pole surface, to selectively move an object of the vehicle as the armature moves between a first position and a second position. The push rod comprises a body extending longitudinally along an axis between a first body end and a second body end. The body is configured to engage the armature at the first body end and the body configured to engage the object at the second body end.

The push rod further comprises a flange between or at the first and second body ends. The flange extends from the body radially away from the axis to a perimeter surface such that the flange encircles the body. The flange has an engagement surface configured to abut the pole surface of the core, with the engagement surface defining a channel opening toward the second body end. The perimeter surface defines a perimeter opening at the channel for facilitating flow of a fluid into the channel between the engagement surface and the pole surface of the core for preventing a vacuum therebetween when the engagement surface abuts the pole surface of the core.

The subject invention further provides for a method of manufacturing a push rod for use in a vehicle with an electro-mechanical actuator system having an armature and a core, to selectively move an object of the vehicle as the armature moves between a first position and a second position. The push rod comprises a body extending longitudinally along an axis between a first body end and a second body end and a flange between or at the first and second body ends and extending from the body radially away from the axis to a perimeter surface such that the flange encircles the body. The flange has an engagement surface defining a channel opening toward one of the first body end and the second body end. The perimeter surface defines a perimeter opening at the channel.

The method comprises the steps of providing a material and drawing and swaging the material to produce the push rod.

Accordingly, the prevention of a vacuum between the engagement surface and the pole surface of the core prevents lock-up of the push rod and promotes the desired function of the push rod. Furthermore, the drawing, swaging, and forging of the push rod increases throughput of the push rod while reducing excess waste material.

BRIEF DESCRIPTION OF THE DRAWINGS

Advantages of the subject invention will be readily appreciated as the same becomes better understood by reference to the following detailed description when considered in connection with the accompanying drawings.

DETAILED DESCRIPTION OF THE INVENTION

Figure 1:
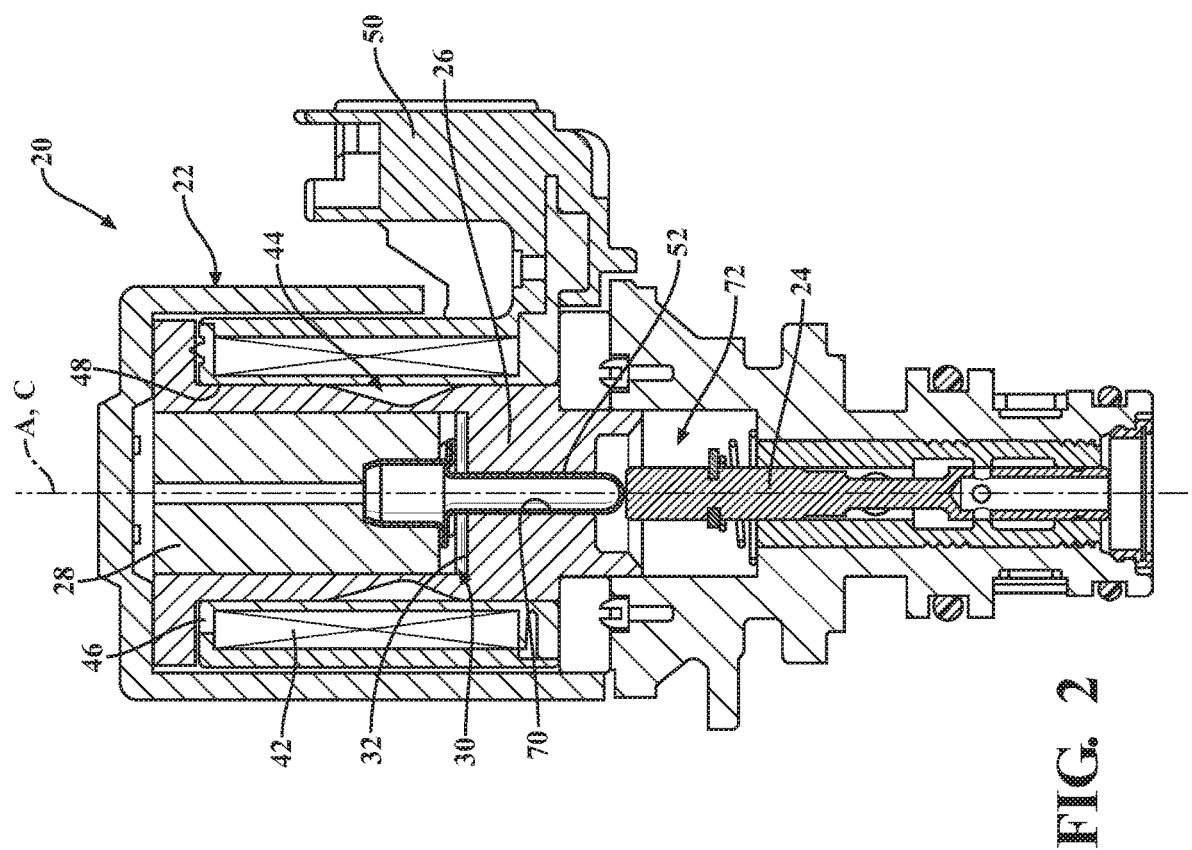
FIG. 1 is a cross-sectional view of an electro-mechanical actuator system showing a core, a push rod, and an armature in a first position.
Figure 2:
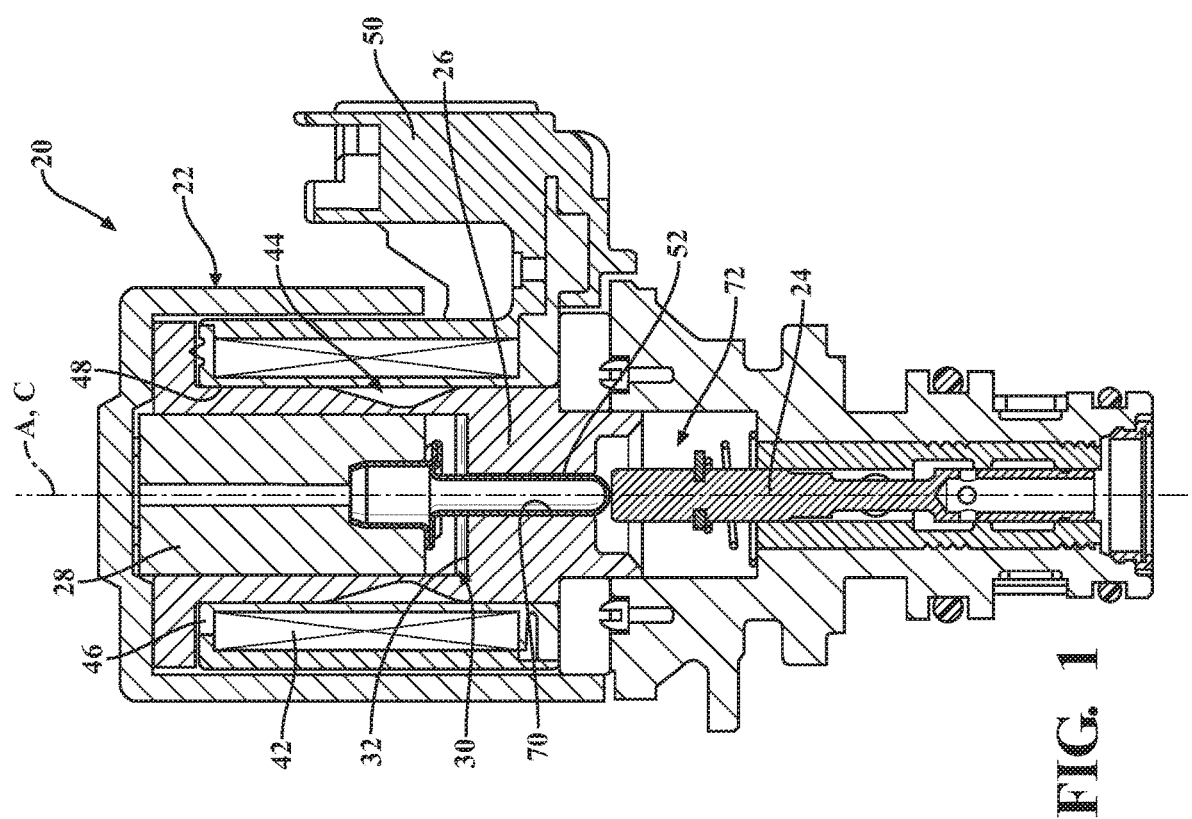
FIG. 2 is a cross-sectional view of the electro-mechanical actuator system showing the core, the push rod, and the armature in the second position.
Figure 3:
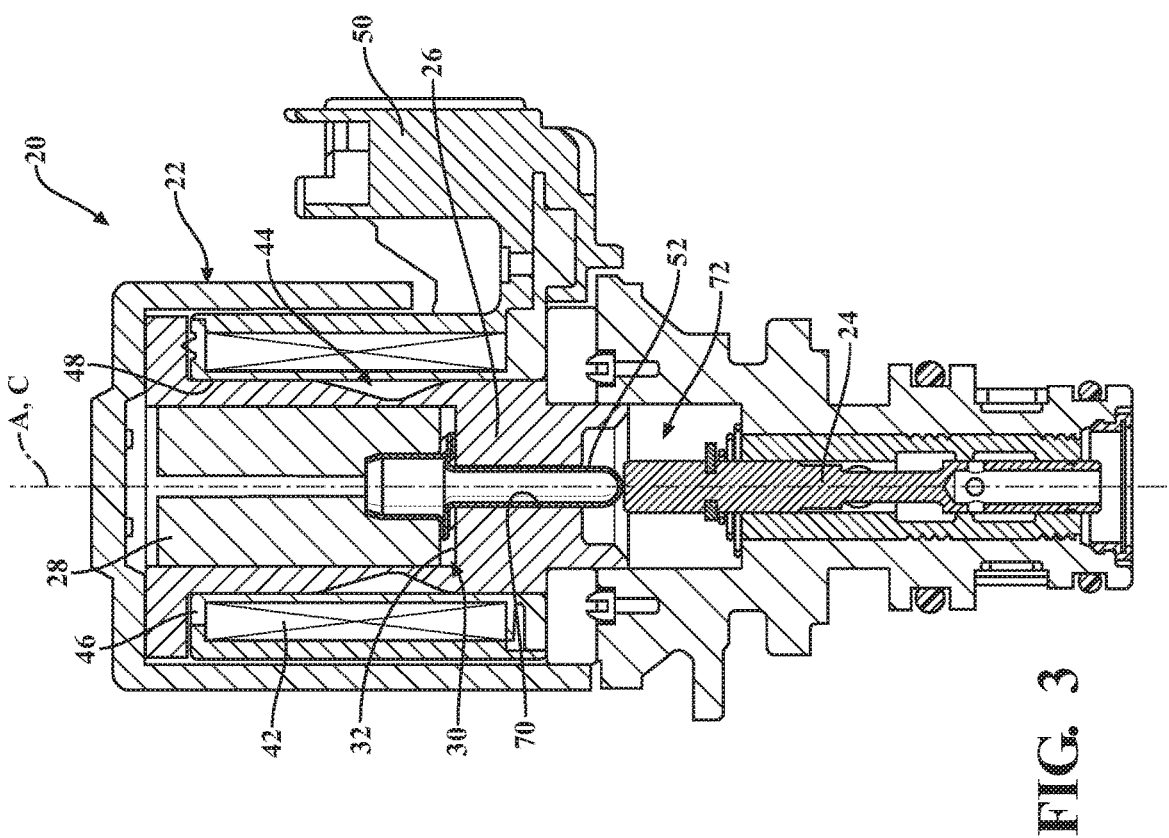
FIG. 3 is a cross-sectional view of the electro-mechanical actuator system showing the core, the push rod in contact with the core, and the armature in the second position.

Referring to the Figures, wherein like numerals indicates like or corresponding parts throughout the several views, an electro-mechanical actuator system 20 is generally shown in FIGS. 1-3. The electro-mechanical actuator system 20 may be used in a vehicle to selectively move an object 24 of the vehicle. As shown in FIGS. 1-3, the electro-mechanical actuator system 20 may linearly move the object 24 (i.e., linear motion), as will be better appreciated through further description below. However, one having skill in the art will appreciate that the electro-mechanical actuator system 20 may rotationally move the object 24 (i.e., rotary motion), or may move the object 24 in any other suitable manner.

In one embodiment, the electro-mechanical actuator system 20 is used in vehicles. As one non-limiting example, the electro-mechanical actuator system 20 may be used in a transmission of the vehicle for actuating hydraulic controls, such as clutch actuation and gear actuation. As another non-limiting example, the electro-mechanical actuator system 20 may be used with a cam phaser of the vehicle for adjusting cam timing of an engine. One having skill in the art will appreciate that the electro-mechanical actuator system 20 may be used anywhere within the vehicle for moving the object 24. Moreover, the electro-mechanical actuator system 20 may be used in any application that requires movement of the object 24.

As shown in FIGS. 1-3, the electro-mechanical actuator system 20 comprises a coil 22 surrounding and extending along a coil axis C and transitionable between a de-energized state and an energized state, with the coil 22 configured to conduct electric current and produce a magnetic field in the energized state. As such, in the energized state the electric current is transmitted to through the coil 22. In one embodiment, the electric current is a direct current. One having skill in the art will appreciate that the electric current may be an alternating current or any other type of current. Furthermore, when the coil 22 is in the de-energized state, the coil 22 may be without an electric current transmitted therethrough. Alternatively, when the coil 22 is in the de-energized state, the electric current may be transmitted through the coil 22, but at such an amount such that no magnetic field is produced or a minimal magnetic field, incapable of moving the object 24 described above, is produced.

The magnetic field refers to a region around the coil 22 through which the electric current is moving within which the force of magnetism acts. The magnetic field extends arcuately away from and along the coil axis C ends of the coil 22. Furthermore, the magnetic field acts radially about the coil axis C. One having skill in the art will appreciate that the orientation of the magnetic field may vary without escaping the scope of the present invention.

The electro-mechanical actuator system 20 further comprises a core 26 defining an interior 30 and having a pole surface 32 facing the interior 30. The electro-mechanical actuator system further comprises an armature 28 disposed in the interior 30 of the core 26. The armature 28 is comprised of a magnetically-permeable material and is movable along the coil axis C between a first position, corresponding with the de-energized state of the coil 22 (as shown in FIG. 1), and a second position, corresponding with the energized state of the coil 22 (as shown in FIG. 3).

The armature 28 may be movable between a plurality of positions. Moreover, the first and second positions may each individually correspond with any of the plurality of positions. More specifically, the first position may be any one of the plurality of positions in which the armature 28 is disposed when the coil 22 is in the de-energized state. On the other hand, the second position may be any one of the plurality of positions in which the armature 28 is disposed when the coil 22 is in the energized state. As a non-limiting example, in FIG. 1 the coil 22 is in the de-energized state. As such, the armature 28 is disposed in the first position. In FIGS. 2 and 3, the coil 22 is in the energized state. The armature 28 is in different positions between FIGS. 2 and 3. However, since the coil 22 is in the energized state in both of FIGS. 2 and 3, the armature 28 is disposed in the second position in both of FIGS. 2 and 3.

As shown in the Figures, the core 26 is a unitary design. However, one having skill in the art will appreciate that the core 26 may be formed of a plurality of components.

The armature 28 and the core 26 may define a flux path for receiving the magnetic field when the coil 22 is in the energized state, with the reception of the magnetic field in the flux path facilitating movement of the armature 28 from the first position to the second position. As described above, the armature 28 is comprised of a magnetically-permeable material. Moreover, the core 26 partially defines the flux path. As such, the core 26 may also be comprised of a magnetically-permeable material. A magnetically-permeable material is a material capable of supporting the formation of a magnetic field within itself. As such, the magnetic field produced by the coil 22 is capable of being received by the armature 28 and the core 26. A magnetically-permeable material may be ferrous metal (i.e., a metal comprising iron). However, one having skill in the art will appreciate that the magnetically-permeable material may be any material capable of supporting the formation of a magnetic field within itself.

As described above, the magnetic field extends arcuately away from the coil axis C and between the ends of the coil 22 and along the coil axis C between the ends of the coil 22. As such, the armature 28 and the core 26 are configured to collectively receive the magnetic field extending arcuately away from and along the coil axis C to define the flux path.

As shown in FIGS. 1-3, the coil 22 may comprise a wire 42 wound about the coil axis C and defining a void 44 along the coil axis C between the ends of the coil 22. The wire 42 may be comprised of a metallic material. In one embodiment, the metallic material is copper. One having skill in the art will appreciate that the wire 42 may be comprised of any electrically conductive material. The transmission of the electric current through the wire 42 in the energized state may produce the magnetic field.

The armature 28 may be at least partially disposed within the coil 22 such that the flux path extends through the void 44 between the ends of the coil 22. As shown in FIGS. 1-3, the armature 28 extends through the coil 22. One having skill in the art will appreciate that any portion of the armature 28 may be disposed within the coil 22 in any of the first and second positions.

Because the armature 28 is comprised of the magnetically-permeable material, the armature 28 may receive the magnetic field along the coil axis C through the void 44 of the coil 22 to route the flux path through the void 44 between the ends of the coil 22.

As shown in FIGS. 1-3, the electro-mechanical actuator system 20 may further include a bobbin 46 supporting the coil 22. Said differently, the bobbin 46 may be at least partially disposed within the void 44 of the coil 22. When the coil 22 is comprised of the wire 42, the wire 42 may be wrapped around the bobbin 46. The bobbin 46 may have a substantially cylindrical configuration and may define a bobbin bore 48 along the coil axis C. Moreover, the armature 28 may be at least partially disposed within the bobbin bore 48 of the bobbin 46.

The bobbin 46 may be comprised of a non-magnetically-permeable material. A non-magnetically-permeable material is a material incapable of supporting the formation of a magnetic field within itself. As such, the magnetic field produced by the coil 22 is incapable of being received by the bobbin 46. A magnetically-permeable material may comprise one of a polymeric material and a non-ferrous metal. However, one having skill in the art will appreciate that the non-magnetically-permeable material may be any material incapable of supporting the formation of a magnetic field within itself.

The bobbin 46 may be fixed to the core 26. Alternatively, the bobbin 46 may be spaced from but fixed relative to the core 26. As shown in FIGS. 1-3, the bobbin 46 may have an electrical connector 50 extending transverse to the coil axis C. The electrical connector 50 may be electrically connected to the coil 22. The electrical connector 50 is configured to electrically couple the coil 22 with a source of electric current.

The electro-mechanical actuator system 20 further includes a push rod 52 moveable with the armature 28 for transmitting the movement of the armature 28 to the object 24. Said differently, the armature 28 is indirectly coupled to the object 24 through the push rod 52. As such, movement of the armature 28 between the first and second positions effectuates movement of the object 24.

The push rod 52 may be fixed to the armature 28 such that the push rod 52 and the armature 28 move together as a unit. In one embodiment, the push rod 52 is press-fit into the armature 28. Alternatively, the push rod 52 may be fixed to the armature 28 by welding, brazing, adhesion, mechanical fastener, or any other suitable manner.

Figure 4:
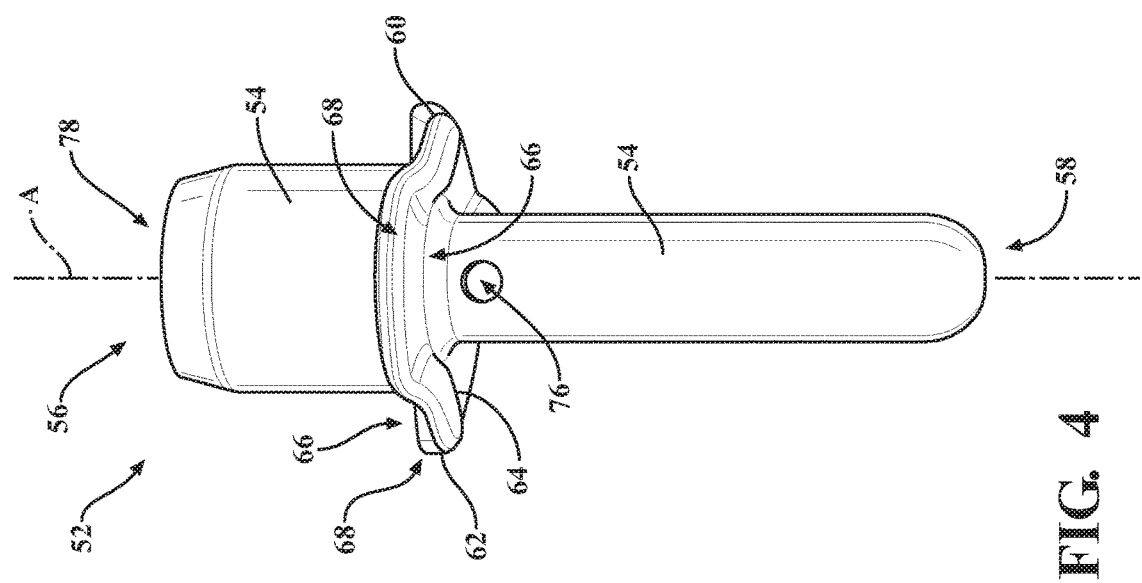
FIG. 4 is a perspective view of the push rod showing a flange and a body defining an aperture.

As shown in FIG. 4, the push rod 52 comprises a body 54 extending longitudinally along an axis A, aligned with the coil axis C, between a first body end 56 and a second body end 58. The body 54 is configured to engage the armature 28 at the first body end 56 and the body 54 configured to engage the object 24 at the second body end 58.

As shown in FIGS. 4-7, the push rod 52 further comprises a flange 60 between or at the first and second body ends 56, 58, with the flange 60 extending from the body 54 radially away from the axis A to a perimeter surface 62 such that the flange 60 encircles the body 54. The flange 60 has an engagement surface 64 abutable with the pole surface 32 of the core 26. The engagement surface 64 defines a channel 66 opening toward the second body end 58. The perimeter surface 62 defines a perimeter opening 68 at the channel 66 for facilitating flow of a fluid into the channel 66 between the engagement surface 64 and the pole surface 32 of the core 26 for preventing a vacuum therebetween when the engagement surface 64 abuts the pole surface 32 of the core 26.

The electro-mechanical actuator system 20 maybe filled with a fluid. I one embodiment the fluid is gaseous (air). In another embodiment (such as in a transmission), the fluid is a liquid, such as hydraulic fluid.

As described above, the perimeter opening 68 and the channel 66 facilitate the flow of the fluid between the engagement surface 64 and the pole surface 32 of the core 26 for preventing a vacuum therebetween when the engagement surface 64 abuts the pole surface 32 of the core 26. As shown in FIG. 4, the flange 60 encircles the body 54. If the flange 60 did not have the channel 66 and the perimeter opening 68, the engagement surface 64 would seal against the pole surface 32 of the core 26 about the body 54, causing a vacuum therebetween. This is especially common when the fluid is a liquid. The liquid is forced out between the engagement surface 64 and the pole surface 32 of the core 26 and is displaced around the flange 60. The liquid (which is nearly incompressible) pressurizes the flange 60 opposite the engagement surface 64 while between the engagement surface 64 and the pole surface 32 of the core 26 is almost devoid of the liquid. Therefore, zero or negative pressure results between the engagement surface 64 and the pole surface 32 of the core 26. Such a condition is commonly referred to, by people having skill in the art, as hydrolock. The perimeter opening 68 and the channel 66 facilitating the flow of the fluid between the engagement surface 64 and the pole surface 32 the core 26 equalizes the pressure of the fluid about the flange 60, preventing the vacuum.

Accordingly, the prevention of a vacuum between the engagement surface 64 and the pole surface 32 of the core 26 prevents lock-up of the push rod 52 and promotes the desired function of the push rod 52.

The push rod 52 may be comprised of a material having low magnetic permeability, such as stainless steel or aluminum, to prevent the magnetic field from acting on the push rod 52, rather than the armature 28. As such, if the engagement surface 64 abuts the pole surface 32 of the core 26, the magnetically permeable armature 28 and core 26 are spaced from one another by the push rod 52 (having low magnetic permeability) to prevent direct contact and magnetic locking between the armature 28 and the core 26. However, one having skill in the art will appreciate that in other embodiments magnetically permeable materials, as well as other non-magnetically permeable materials, could be used to form the push rod 52. Furthermore, the push rod 52 may be formed of a plurality of materials.

As described above, the push rod 52 is movable with the armature 28, as shown in FIGS. 1-3. More specifically, the push rod 52 may be fixed to the armature 28 (as described above) such that any movement of the armature 28 directly results in corresponding movement of the push rod 52. Alternatively, the armature 28 and the push rod 52 may abut one another and may not be fixed. For example, the armature 28 may abut and move the push rod 52 to at least the second position when the electro-mechanical actuator system 20 is in the energized state, as shown in FIG. 3. The push rod 52 may also move with the armature 28 to the first position when the electro-mechanical actuator system 20 is in the de-energized state, as shown in FIG. 1. More specifically, the object 24 may be biased to engage and move the push rod 52 with the armature 28 as the armature 28 moves from the second position to the first position (i.e., when the electro-mechanical actuator system 20 transitions from the energized state to the de-energized state). One having skill in the art will appreciate that the opposite may be true: the armature 28 may abut and move the push rod 52 as the armature 28 moves from the second position to the first position. Furthermore, one having skill in the art will appreciate that the push rod 52 is movable with the armature 28 in any suitable manner and configuration As such, the push rod 52 acts as an extension of the armature 28, which is used to transfer movement of the armature 28 to the object 24.

As described above, the flange 60 of the push rod 52 may abut the flange surface of the core 26. One having skill in the art will appreciate that the flange 60 may engage any other component of the electro-mechanical actuator system 20 without escaping the scope of the subject invention.

As shown in FIGS. 1-3, the body 54 may extend through a hole 70 defined by the core 26 such that the hole 70 interconnects the interior 30 of the core 26 with an exterior 72 of the core 26, with the body 54 at least partially disposed in the interior 30 of the core 26. More specifically, the body 54 may be movable within the hole 70 with at least a portion of the body 54 disposed within the interior 30 of the core 26 at any given time to facilitate the transmission of movement from the armature 28 to the object 24.

As shown in FIGS. 1-3, the flange 60 of the push rod 52 may be disposed in the interior 30 of the core 26. As such, the flange 60 of the push rod 52 may engage each of the armature 28 and the core 26. In such a configuration, the push rod 52 may be partially retained in the interior 30 (i.e., along the axis A) by both the core 26 and the armature 28. One having skill in the art will appreciate that the flange 60 may be disposed in the exterior 72 of the core 26 in another suitable embodiment.

As such, the flange 60 is capable of freely moving with the armature 28 as the armature 28 moves between the first and second positions without being retained in abutment with the pole surface 32 of the core 26 as a result of a vacuum between the flange 60 and the pole surface 32 of the core 26.

As shown in FIGS. 4-7, the channel 66 may be further defined as a plurality of channels 66 and the perimeter opening 68 may be further defined as a plurality of perimeter openings 68 individually corresponding with the plurality of channels 66. Said differently, each channel 66 is individually associated with one of the perimeter openings 68.

Figure 7:
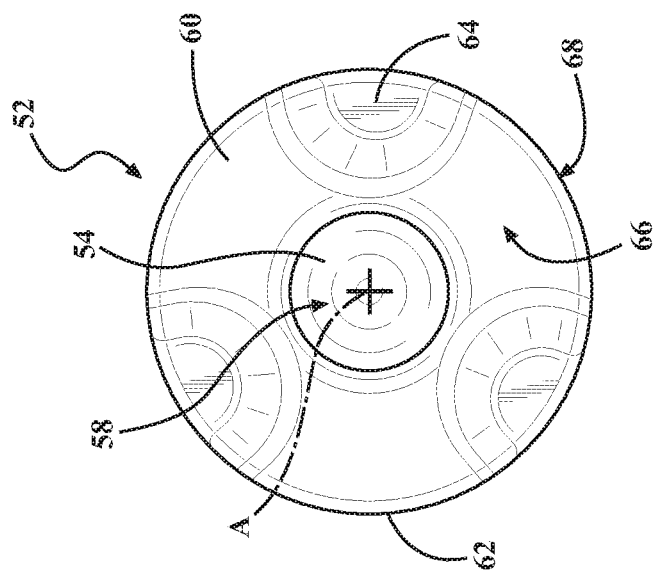
FIG. 7 is a bottom elevational view of the push rod.
Figure 5:
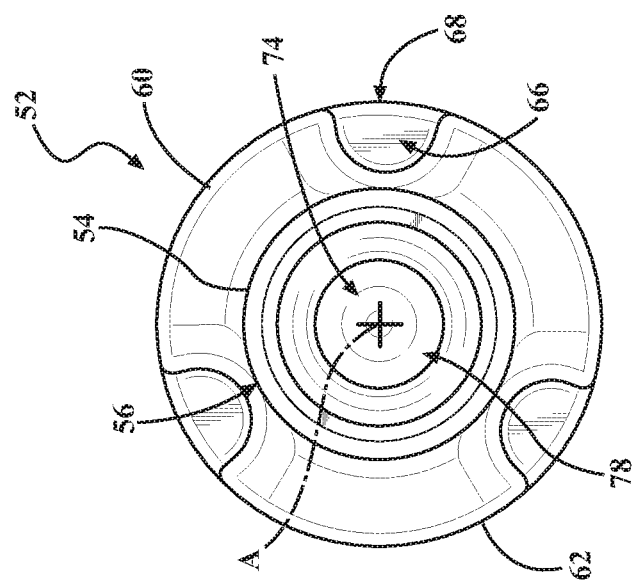
FIG. 5 is a top elevational view of the push rod.

The plurality of channels 66 and the plurality of perimeter openings 68 may be radially disposed about the axis A, as shown in FIGS. 5 and 7. Said differently, the plurality of channels 66 may be spaced from one another about the axis A with the plurality of channels 66 extending outwardly away from the axis A to the plurality of perimeter openings 68. One having skill in the art will appreciate that the plurality of channels 66 may be positioned in any suitable configuration about the axis A.

Figure 6:
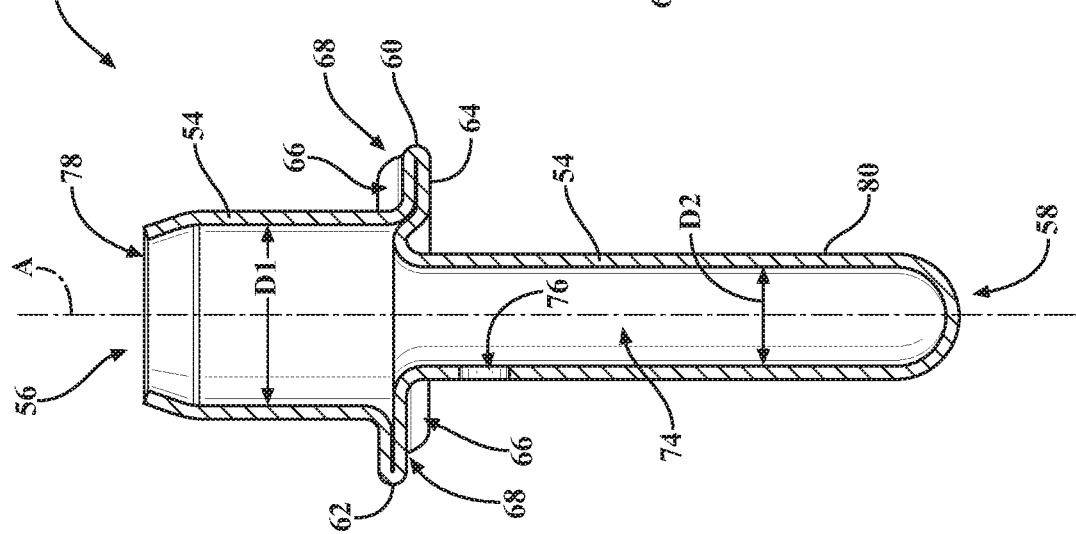
FIG. 6 is a cross-sectional view of the push rod showing a void of the body and the aperture.

As shown in FIG. 4, the body 54 may have a substantially cylindrical configuration radially oriented about the axis A. The term "substantially cylindrical configuration" may refer to the body 54 having a circular, or almost circular, shape cross-sectionally to the axis A. The size of the body 54 may vary along the axis A and the body 54 may still be referred to as having a substantially cylindrical configuration. For example, the body 54 may have a first diameter D1 at the first body end 56 and a second diameter D2, different than the first diameter D1, at the second body end 58, as shown in FIG. 6. More specifically, the first diameter D1 may be greater than the second diameter D2. As such, the body 54 may have a stepped configuration between the first and second body ends 56, 58 as the body 54 changes from the first diameter D1 to the second diameter D2. Alternatively, the first and second diameters D1, D2 may be the same. One having skill in the art will appreciate that the first and second diameters D1, D2 may be any suitable size, both independently and relative to one another.

The body 54 may define a void 74 along the axis A. The void 74 may have a substantially cylindrical configuration, like the body 54 itself, such that the body 54 has a substantially uniform wall thickness between the first and second body ends 56, 58. One having skill in the art will appreciate that the void 74 may have any suitable size, shape and configuration.

As shown in FIGS. 4 and 6, the body 54 may define an aperture 76 transverse to the axis A and opening into the void 74, with the aperture 76 fluidly coupled with the void 74 for facilitating flow of the fluid into and out of the void 74 at the aperture 76.

The body 54 may define the void 74 along the axis A between first and second body ends 56, 58. Furthermore, as shown in FIG. 6, the body 54 may define a distal opening 78 at one of the first and second body ends 56, 58, with the distal opening 78 fluidly coupled with the void 74 for facilitating flow of the fluid between the aperture 76 and the distal opening 78 through the void 74. The distal opening 78 may be defined at the first body end 56, with the void 74 of the body 54 fully enclosed at the second body end 58. Alternatively, the distal opening 78 may be defined at the second body end 58. Furthermore, both the first and second body ends 56, 58 may define distal openings 78. As shown FIG. 6, the distal opening 78 is defined along the axis A. One having skill in the art will appreciate that the distal opening 78 may be defined transverse to the axis A.

As shown in FIG. 4, the aperture 76 is located adjacent the channel 66 such that the aperture 76 opens into the channel 66 for facilitating flow of the fluid between the channel 66 and the void 74 to prevent a vacuum between the engagement surface 64 and the one of the armature 28 and the core 26 when the engagement surface 64 abuts the one of the armature 28 and the core 26. Said differently, the aperture 76 further facilitates the equalization of fluid pressure about the flange 60. As shown in FIGS. 4 and 6, the aperture 76 is located adjacent the channel 66 defined by the engagement surface 64 which abuts the core 26. As such, the aperture 76 further aides in preventing a vacuum between the flange 60 and the core 26. One having skill in the art will appreciate that the aperture 76 may be located adjacent the channel 66 defined by the engagement surface 64 which abuts the armature 28 for further aiding in prevention of a vacuum between the flange 60 and the armature 28. One having skill in the art will appreciate that the aperture 76 may be any number of apertures individually or collectively positioned adjacent any of the plurality of channels 66.

Alternatively, the flange 60 may define the aperture 76. More specifically, the flange 60 may define the aperture 76 at the channel 66 such that the aperture 76 opens into the channel 66. As such, fluid may move between opposing sides of the flange 60 to prevent hydrolock, as described above.

The subject invention further provides for a method of manufacturing the push rod 52 for use in the vehicle to selectively move the object 24 of the vehicle as the armature 28 moves between the first position and the second position. As mentioned above, the electro-mechanical actuator system 20 comprises the armature 28 and the core 26. The push rod 52 comprises the body 54 extending longitudinally along the axis A between the first body end 56 and the second body end 58 and the flange 60 between or at the first and second body ends 56, 58 and extending from the body 54 radially away from the axis A to the perimeter surface 62 such that the flange 60 encircles the body 54. The flange 60 has the engagement surface 64 defining the channel 66 opening toward the second body end 58. The perimeter surface 62 defines the perimeter opening at the channel 66.

Figure 10:
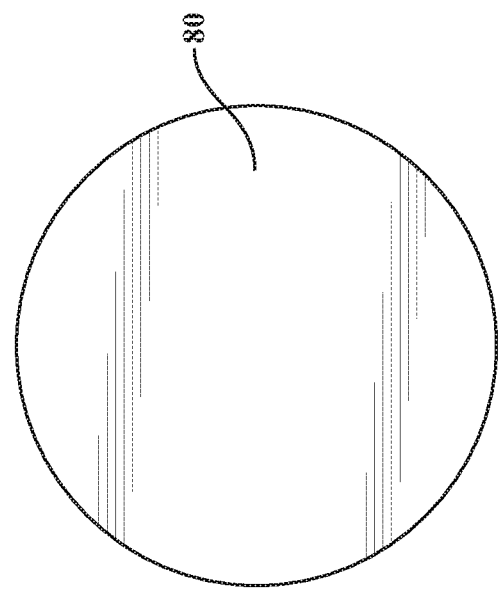
FIG. 10 is a top elevational view of the material.
Figure 9:
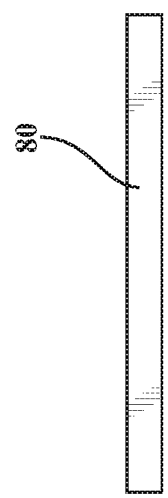
FIG. 9 is a cross-sectional view of a material.
Figure 12:
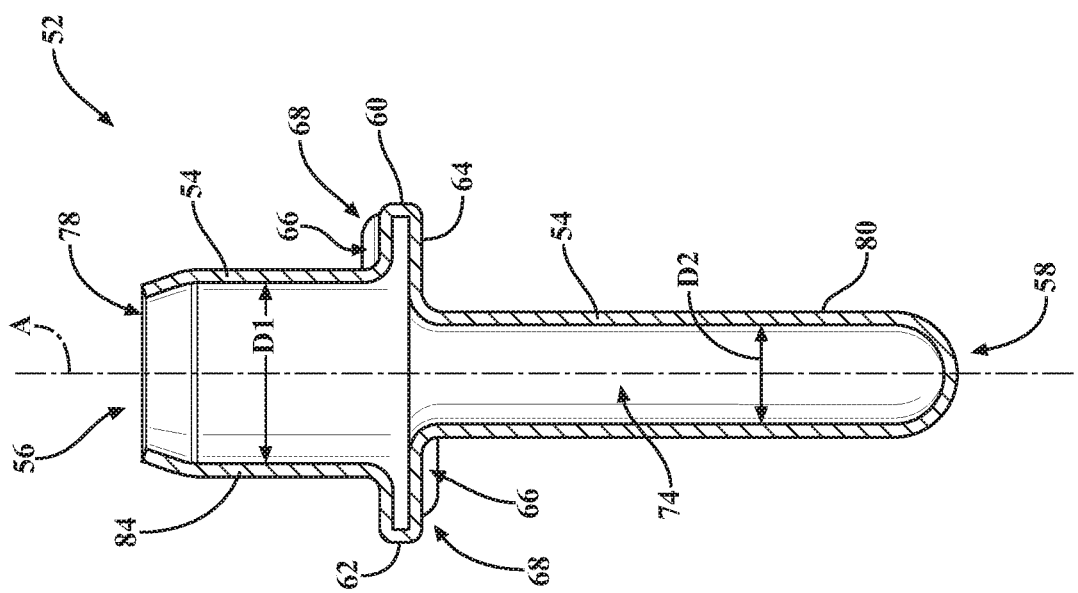
FIG. 12 is a cross-sectional view of a swaged material showing the body and the flange.

The method comprises the steps of providing a material 80 (as shown in FIGS. 9 and 10), and drawing and swaging the material 80 to produce the push rod 52 (as shown in FIG. 12).

The drawing and swaging of the push rod 52 increases throughput of the push rod 52 while reducing excess waste material.

As shown in FIG. 9, the material 80 may be a substantially planar material capable of forming a uniform sidewall of the body 54 of the push rod 52. However, it is to be appreciated that the material 80 may be any suitable shape and size. Typically, the material 80 is a metallic material such as stainless steel or aluminum. However, one having skill in the art will appreciate that the material 80 may be any material capable of being formed as set forth herein.

As it is commonly known in the art, drawing involves the pulling of a material through an orifice of a die to stretch the material into a desired shape. Moreover, as it is commonly known in the art, the step of swaging involves the altering of a diameter of a material by extrusion, forging, or the like.

Figure 11:
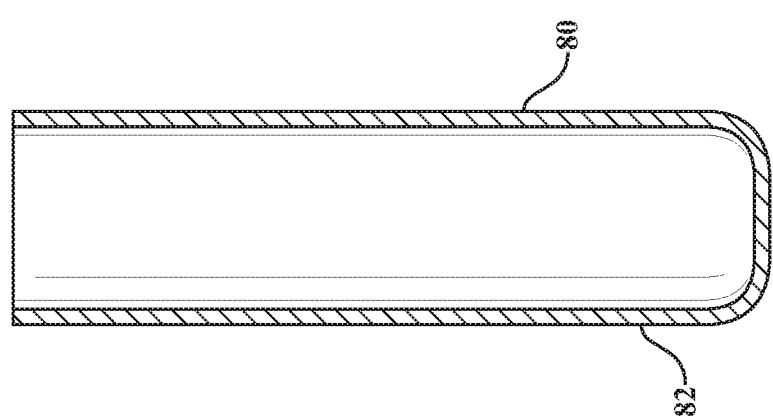
FIG. 11 is a cross-sectional view of a drawn material.

The step of drawing the material 80 may be further defined as drawing the material 80 at least twice. One having skill in the art will appreciate that the step of drawing the material 80 may be performed any number of times without escaping the scope of the subject invention. Likewise, the step of swaging the material 80 may be further defined as swaging the material 80 at least twice. One having skill in the art will appreciate that the step of swaging the material 80 may be performed any number of times without escaping the scope of the subject invention. Moreover, one having skill in the art will appreciate that the steps of drawing and swaging the material 80 may be performed in any sequence (including sequential, repeated steps of drawing or swaging) without escaping the scope of the subject invention. As a non-limiting example, the step of drawing and swaging the material 80 to produce the push rod 52 may be further defined as drawing the material 80 to produce a drawn material 82 having a substantially cylindrical configuration (as shown in FIG. 11), and swaging the drawn material 82 to produce a swaged material 84 further defined as the push rod 52 (as shown in FIG. 12). One having skill in the art will appreciate that the drawn material 82 and the swaged material 84 may have any suitable shape and configuration without escaping the scope of the subject invention.

In accordance with the non-limiting example, the drawn material 82 (shown in FIG. 11) has the substantially cylindrical configuration. Therefore, the step of swaging the drawn material 82 may alter the diameter of the drawn material 82 to produce the swaged material 84 comprising the body 54 and the flange 60. As set forth above, the body 54 may have the first and second diameters D1, D2. The flange 60 has a diameter greater than the first and second diameters D1, D2, which provides a contact surface for any additional deformation of the flange 60. One having skill in the art will appreciate that the swaged material 84 may have any suitable shape and configuration.

Figure 13:
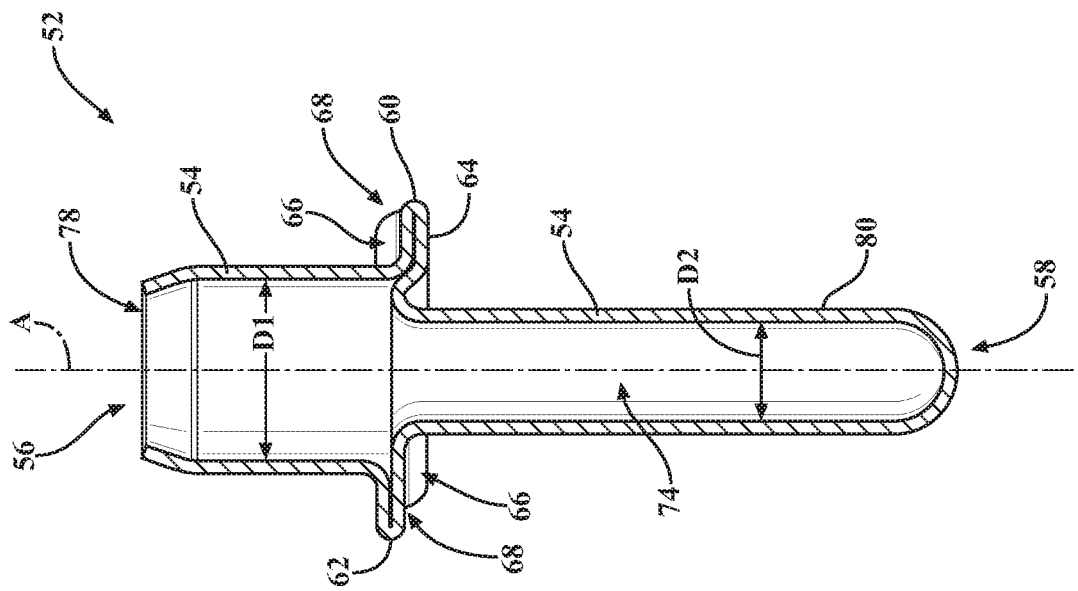
FIG. 13 is a cross-sectional view of the push rod showing the body and the flange.

The method may further include the step of forging the flange 60 of the swaged material 84 to further form the flange 60 and the channel 66 (as shown in FIG. 13). More specifically, the flange 60 and the channel 66 of the push rod 52 may be formed after the steps of drawing and swaging the material, as shown in FIG. 12. The step of forging the flange 60 further shapes the flange 60 and the channel 66. As it is commonly known in the art, the step of forging involves the shaping of material by applying a compressive force. The step of forging the flange 60 may be performed by vertical forging, horizontal forging, or any other suitable forging process. One having skill in the art will also appreciate that the step of forging the flange 60 may be performed by a plurality of forging steps.

Figure 8:
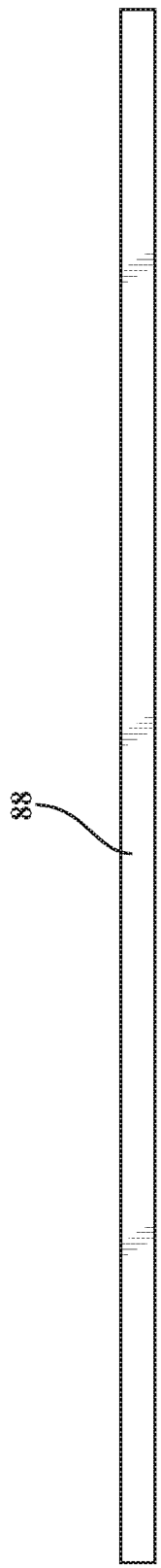
FIG. 8 is a cross-sectional view of an initial material.

The method may further include the steps of providing an initial material 88 (as shown in FIG. 8) having a substantially planar configuration and blanking the initial material 88 to produce the material 80, prior to the step of providing the material 80. Typically, the initial material 88 has a planar configuration, which is then reduced in size by coining to form the material 80. One having skill in the art will appreciate that the initial material 88 may have any suitable shape and configuration.

The step of providing the material 80 may be further defined as the step of providing the material 80 having a circular configuration, as shown in FIG. 10. However, one having skill in the art will appreciate that the material 80 may have any suitable shape and configuration.

The method may further include the step of drilling the body 54 to define the aperture 76 transverse to the axis A, as shown in FIG. 6. Furthermore, the step of drilling the body 54 may be further defined as the step of drilling the body 54 to define the aperture 76 transverse to the axis A and adjacent the channel 66.

The invention has been described in an illustrative manner, and it is to be understood that the terminology which has been used is intended to be in the nature of words of description rather than of limitation. As is now apparent to those skilled in the art, many modifications and variations of the subject invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An electro-mechanical actuator system for use in a vehicle to selectively move an object of the vehicle, said electro-mechanical actuator system comprising:
    a coil surrounding and extending along a coil axis and transitionable between a de-energized state and an energized state, with said coil configured to conduct electric current and produce a magnetic field in said energized state;
    a core defining an interior and having a pole surface facing said interior; and
    an armature disposed in said interior of said core, wherein said armature is comprised of a magnetically-permeable material and is movable along said coil axis between a first position, corresponding with said de-energized state of said coil, and a second position, corresponding with said energized state of said coil;
    a push rod moveable with said armature for transmitting the movement of said armature to the object, said push rod comprising:
        a body extending longitudinally along an axis, aligned with said coil axis, between a first body end and a second body end, with said body configured to engage said armature at said first body end and said body configured to engage the object at said second body end; and
        a flange between or at said first and second body ends, with said flange extending from said body radially away from said axis to a perimeter surface such that said flange encircles said body;
    wherein said flange has an engagement surface abuttable with said pole surface of said core, with said engagement surface defining a channel opening toward said second body end;
    wherein said perimeter surface defines a perimeter opening at said channel for facilitating flow of a fluid into said channel between said engagement surface and said pole surface of said core for preventing a vacuum therebetween when said engagement surface abuts said pole surface of said core; and
    wherein said flange is disposed in said interior of said core.

2. The electro-mechanical actuator system as set forth in claim 1, wherein said body extends through a hole defined by said core such that said hole interconnects said interior of said core with an exterior of said core, with said body at least partially disposed in said interior of said core.

3. A push rod for use in a vehicle with an electro-mechanical actuator system having an armature and a core having a pole surface, to selectively move an object of the vehicle as the armature moves between a first position and a second position, said push rod comprising:

a body extending longitudinally along an axis between a first body end and a second body end, with said body configured to engage said armature at said first body end and said body configured to engage the object at said second body end; and a flange between or at said first and second body ends, with said flange extending from said body radially away from said axis to a perimeter surface such that said flange encircles said body;

wherein said flange has an engagement surface configured to abut the pole surface of the core, with said engagement surface defining a channel opening toward said second body end;

wherein said perimeter surface defines a perimeter opening at said channel for facilitating flow of a fluid into said channel between said engagement surface and the pole surface of the core for preventing a vacuum therebetween when said engagement surface abuts the pole surface of the core;

wherein said body defines a void along said axis; and wherein said body defines an aperture transverse to said axis and opening into said void, with said aperture fluidly coupled with said void for facilitating flow of the fluid into and out of the void at said aperture.

4. The push rod as set forth in claim 3, wherein said channel is further defined as a plurality of channels and said perimeter opening is further defined as a plurality of perimeter openings individually corresponding with said plurality of channels.

5. The push rod as set forth in claim 4, wherein said plurality of channels and said plurality of perimeter openings are radially disposed about said axis.

6. The push rod as set forth in claim 3, wherein said body has a substantially cylindrical configuration radially oriented about said axis.

7. The push rod as set forth in claim 6, wherein said body has first diameter at said first body end and a second diameter, different than said first diameter, at said second body end.

8. The push rod as set forth in claim 3, wherein said body defines a distal opening at one of said first and second body ends, with said distal opening fluidly coupled with said void for facilitating flow of the fluid between said aperture and said distal opening through said void.

9. The push rod as set forth in claim 8, wherein said aperture is located adjacent said channel such that said aperture opens into said channel for facilitating flow of the fluid between said channel and said void to prevent a vacuum between said engagement surface and the pole surface of the core when said engagement surface abuts the pole surface of the core.

10. A method of manufacturing a push rod for use in a vehicle with an electro-mechanical actuator system having an armature and a core having a pole surface, to selectively move an object of the vehicle as the armature moves between a first position and a second position, with the push rod comprising a body extending longitudinally along an axis between a first body end and a second body end, with the body configured to engage the armature at the first body end and the body configured to engage the object at the second body end, and with the push rod comprising a flange between or at the first and second body ends and extending from the body radially away from the axis to a perimeter surface such that the flange encircles the body, wherein the flange has an engagement surface configured to abut the pole surface of the and core and defining a channel opening toward the second body end, wherein the perimeter surface defines a perimeter opening at the channel for facilitating flow of a fluid into the channel between the engagement surface and the pole surface of the core for preventing a vacuum therebetween when the engagement surface abuts the pole surface of the core, wherein the body defines a void along the axis, and wherein the body defines an aperture transverse to the axis and opening into the void, with the aperture fluidly coupled with the void for facilitating flow of the fluid into and out of the void at the aperture; said method comprising the steps of:

providing a material;

drawing and swaging the material to produce the push rod; and drilling the body of the push rod to define the aperture transverse to the axis.

11. The method as set forth in claim 10, further including the steps of providing an initial material having a substantially planar configuration and blanking the initial material to produce the material, prior to the step of providing the material.

12. The method as set forth in claim 10, wherein the step of drilling the body is further defined as the step of drilling the body to define the aperture transverse to the axis and adjacent the channel.

13. The method as set forth in claim 10, wherein the step of drawing the material is further defined as drawing the material at least twice.

14. The method as set forth in claim 10, wherein the step of providing the material is further defined as the step of providing the material having a circular configuration.

15. The method as set forth in claim 10, wherein the step of drawing and swaging the material to produce the push rod is further defined as drawing the material to produce a drawn material having a substantially cylindrical configuration, and swaging the drawn material to produce a swaged material further defined as the push rod.

\* \* \* \* \*